United States Patent Office 3,046,210
Patented July 24, 1962

3,046,210
PREPARATION OF GELATIN FROM COLLAGENOUS MATERIAL
John R. Lowry, White Plains, N.Y., assignor to General Foods Corporation, White Plains, N.Y., a corporation of Delaware
No Drawing. Filed Jan. 28, 1958, Ser. No. 711,554
6 Claims. (Cl. 204—158)

This invention relates to a process for treating collagen-bearing materials to increase the rate of extraction and the quality of gelatin which may be extracted therefrom, and more specifically to a process employing ionizing, penetrating radiation to obtain gelatin characterized by improved physical properties.

Although gelatin may be prepared by extraction from various collagen-bearing materials, the more common of these stocks are tanners' stock, pig-skin, and ossein. However, skins obtained from buffalo, camels, rabbits, etc., may be employed.

Tanners' stock is obtained as a by-product from leather manufacturing operations and is chiefly cattle skin. Tanners' stock, including hides and trimmings, comes in the form of splits or pieces. Splits usually comprise the flat portions of skin from which the epidermis and flesh have been removed. Pieces consist of trimmings such as cheeking, bellies, etc., and are treated without cutting. As presented to the gelatin manufacturer, tanners' stock may be either dried, pickled, or limed. The drying may have been done in any conventional manner. Pickling is typically accomplished by soaking in sulfuric acid and brine. Liming is effected by soaking in lime solution.

In the lime splits or other forms of tanners' stock, the valuable collagen, which is the precursor of gelatin, is found principally in the corium or skin; it also occurs in connective tissue, tendons, etc.

Ossein is prepared from animal bones which are degreased, ground, and treated with cold dilute hydrochloric acid to dissolve the mineral matter in the bones including calcium phosphate and carbonate. The organic matter which remains is commercial ossein.

Upon being received at the gelatin plant, both tanners' stock and ossein are usually, although not necessarily, treated in a saturated lime solution for from 30 to 120 days depending upon the type of stock, the plant capacity, the temperature, and presence of additives such as sodium hydroxide. With proper liming, tanners' stock becomes swollen and soft, while ossein swells and occasionally turns snow-white; the mucins and albumins are dissolved and most of the remaining grease is saponified. After liming, the lime solution is drained off and the stock is removed from the lime pits. The stock may be washed with water, dilute hydrochloric acid, and finally with water until the desired cooking pH, typically 6–7, is reached.

Pigskin stock, like pieces, normally received at the gelatin plant in frozen form, is ordinarily processed in large pieces, and generally does not receive any lime conditioning at the gelatin plant. This stock which is normally received in a frozen form is thawed, washed, and adjusted to a cooking pH of between 4.0 and 4.5 with hydrochloric acid.

The technique of extracting gelatin from these stocks varies depending upon which stock is employed and on the particular conditions prevailing at the gelatin processing plant. Typically, however, the extraction operation, as distinguished from the various preliminary treating, soaking, washing, operations including those hereinbefore noted, comprises soaking the gelatin in an aqueous solution properly adjusted to provide the desired pH for a period of time which, under conditions generally prevailing, may be e.g. from 4 to 8 hours. By varying the conditions including pH, temperature, time, etc., it is possible to modify the bloom and viscosity of the extracted gelatin and the concentration of the gelatin solution. Typically the concentration of the effluent gelatin solution will be 2%–4%–6% gelatin.

If it is attempted to modify conditions to attain e.g. a higher concentration of gelatin in the effluent, it is found that this can only be accomplished in disadvantageously longer periods of time or at the expense of yield. Attempts to increase the bloom and viscosity of the gelatin product have generally only been successful at the expense of yield, and vice versa.

It is an object of this invention to provide a process for extracting gelatin from collagen-containing materials in a shorter time and at higher yields. It is another object of this invention to obtain gelatin of improved physical properties. Other objects of this invention will be apparent to those skilled-in-the-art.

According to certain aspects of this invention, a gelatin characterized by improved physical properties may be prepared by irradiating collagen-containing material with ionizing penetrating radiation and extracting gelatin from the irradiated collagen-containing material.

In practice of this invention, any of the above-mentioned charge stocks may be used; it is preferred, however, to use lime splits. It is also preferred that the stock being irradiated be substantially dry, i.e. superficially dry.

It is found that substantially improved results are obtained, in accordance with this invention, when the stock is dry, i.e. no water or moisture is added to the e.g. lime splits to increase the amount of water therein over that found in the charge as received. When the stock is to be irradiated after pretreatment including e.g. washing, it will preferably be at least superficially dried, i.e. separated from the mass of adhering liquid.

The ionizing penetrating radiation which can be employed to give the desired gelatin product of this invention includes beta and gamma rays. Beta rays include cathode rays, the former term being the common designation when the rays originate from a naturally or artificially radioactive source, while the latter designation is commonly employed to indicate rays produced in an electrical apparatus e.g. of the vacuum tube type.

The term gamma rays as used herein is intended to include therewithin X-rays. The term "gamma" is commonly employed when the rays originate from a naturally or artificially radioactive source, while the term "X-ray" is commonly used when the rays are continuously produced by electron bombardment of suitable targets in an appropriate apparatus.

The ionizing penetrating radiation which can be used in the process of this invention is that having an energy falling within the range of $10^{-3}$ mev. (million electron volts) up to about 15 mev. When the preferred type of radiation, i.e. gamma radiation including X-radiation, is employed, the energy thereof will typically fall in the range of $10^{-3}$ mev. up to about 4.0 mev. Typically the wave length of the preferred gamma radiations will be within the range of 0.001 up to about 14 Angstrom units; the frequency may range from about $10^{17}$ up to about $10^{21}$ per second.

It has been found that gamma rays emitted by radioactive atoms, particularly atoms which have been artificially rendered radioactive by bombardment thereof with e.g. neutrons are particularly suitable for use in connection with this invention. When gamma radiation from such a source is used, the preferred energy ranges of the gamma particles are those falling within the range of $8.8 \times 10^{-3}$ mev. up to 4.0 mev. The wave length of these gamma rays is 0.001 Angstrom unit to about 14 Angstrom units. The frequencies may range from about $10^{17}$ up to about $10^{21}$ per second.

Cobalt-60, a common source of gamma radiation, may be prepared e.g. by irradiating normal cobalt of atomic weight 59 in a uranium pile wherein neutrons are present. As a neutron strikes an atom of cobalt-59, it forms the artificially radioactive cobalt-60 which emits gamma radiation having an energy of 1.1 and 1.3 mev. The half-life of cobalt-60 is 5.3 years.

Irradiation of the gelatin stock may be effected by passing the stock through the radiation beam. The distance between the radiation source and the stock being irradiated may vary, but typically it will be of the order of from 1 inch to about 18 inches. Under these conditions irradiation may occur for a period ranging from about 5 seconds up to as long as 8 hours. In the case of beta radiation, the time may be as little as 5 seconds and the preferred maximum will not be above 15 minutes. The time of radiation will depend on the strength of the radiation source. In the case of gamma radiation, the preferred range is 15 minutes to 3 hours with best results being obtained at the longer times. The amount of radiation to which the gelatin stock is subjected is measured in terms of the r.e.p. (roentgen equivalent physical). A r.e.p. is a measure of the amount of radiation falling on a particular material, and is measured by determining the effect upon a standard such as the commonly used methylene blue or iron sulfate indicator, located immediately adjacent to the sample being irradiated. At the conclusion of the radiation experiment, the number of r.e.p.'s supplied to the stock can be determined by comparing the irradiated methylene blue or iron sulfate with a standard non-irradiated sample thereof.

Although some improvement is observed at radiation dosages of less than $0.5 \times 10^6$ r.e.p., the preferred dosage range is $0.5-1.5 \times 10^6$ r.e.p. As the dosage is increased above $1.5 \times 10^6$ r.e.p., the additional improvement which is obtained is slight.

The temperature at which radiation is effected may vary; preferably it will be effected at ambient temperatures. No special temperature conditioning of the stock need be provided; i.e., if the stock be received frozen, it can be irradiated as such. Preferably also the stock will be irradiated in dry (i.e. superficially dry) state rather than in mixture with substantial quantities of water.

The stock which has been subjected to irradiation is then passed through an extraction operation wherein it may be contacted with water which has been preheated to a temperature typically within the range of $50°$ C.-$95°$ C. Preferably, however, the temperature range will be maintained at $65°-75°$ C. Typically the time of extraction may be of the order of 2 hours and the effluent solution from the extraction will preferably contain at least about 2%-3% and less than 4%-6% gelatin solids.

The effluent gelatin solution may be treated in any suitable manner by addition of various materials to modify the pH thereof. Preferably the pH of the gelatin will be raised to fall within the range 4.0-5.0, although under certain conditions it may be raised to as high as e.g. 7.5.

The gelatin extraction liquor may be concentrated to desired concentration of e.g. 20%-30%, and then chilled and dried according to any of the standard techniques to obtain the solid dry gelatin of commerce. It is one of the features of this invention that the so-prepared gelatin is characterized by substantially improved physical properties. The bloom and viscosity as well as the molecular weight are found to be considerably in excess of the corresponding properties of gelatin which has been extracted from otherwise similarly treated stock which has not been subjected to the process of this invention.

When gelatin is prepared in accordance with this invention, it is found that the intrinsic viscosity may be increased by as much as 400%; and the yield-time (i.e. the yield in a given time) may be increased by e.g. as much as 250%. Furthermore, the concentration of gelatin in the gelatin extract in a given time may be increased by a factor of as much as 2 or more without any compensating disadvantages.

According to a specific example of this invention, lime splits (grade excellent), which were superficially dry and which contained 11% moisture, were irradiated with gamma radiation emanating from cobalt-60. Radiation was effected by placing the lime splits at a distance of 2 inches from a 4.5 kilocurie source of cobalt-60 for a time sufficient to give the desired degree of radiation. In 3 separate examples the radiation dosages were maintained at, respectively, $0.5 \times 10^6$ r.e.p.; $1 \times 10^6$ r.e.p.; and $1.5 \times 10^6$ r.e.p. Temperature of radiation was ambient temperature, i.e. the lime splits as received were at normal room temperature of $25°$ C., and no external cooling or heating was provided during the irradiation other than that resulting from the effect of gamma rays which is very slight.

After the irradiation of each of the three samples was complete, each sample was separately ground to a fibrous powder and extracted with 0.02 M hydrochloric acid at $65°$ C. An identical non-irradiated lime split sample was similarly extracted to serve as a control. Small samples of extract solution were removed at 30 minute intervals and analyzed for gelatin. Table I sets forth the improved results obtained in accordance with this invention.

*Table I*

| Time of Extraction (in minutes) | Irradiation Dosage | | | |
|---|---|---|---|---|
| | Control | $0.5 \times 10^6$ rep. | $1 \times 10^6$ rep. | $1.5 \times 10^6$ rep. |
| 30 | 10 | 14 | 15 | 24 |
| 60 | 23 | 29 | 32 | 58 |
| 120 | 47 | 61 | 72 | 128 |
| 180 | 58 | 76 | 88 | 143 |
| 240 | 62 | 82 | 93 | 146 |

The values noted in the body of the table are arbitrary numbers indicating the gelatin concentration of the solutions. They were determined by a standard biuret technique for testing for gelatin wherein the final value was obtained by a colorimetric comparison.

From the second column of this table it will be observed that the amount of gelatin extracted from the standard non-irradiated stock increased as the time of extraction increased. Thus, after 30 minutes extraction time, the concentration of gelatin in the extract was 10 units; and the maximum concentration obtained after 240 minutes was 62 units. The 3rd, 4th, and 5th columns indicate that the concentration of gelatin in the extract at each time measured was substantially greater for the irradiated sample than at the corresponding time for the control. Thus, the concentration in the solution recovered from the stock which had received $0.5 \times 10^6$ rep. was, after only 30 minutes extraction time, 40% greater than was the standard. The concentration of gelatin in the stock which had been subjected to $1.5 \times 10^6$ rep. was, after 30 minutes, 2.4 times as great as the corresponding concentration of the control solution.

At all times during the extraction, the concentration of the effluent solution from the irradiated samples was substantially higher at a given time than was the control. The maximum concentration, after 2 hours of extraction, ranged from about 30% above that of the standard to about 130% higher than that of the standard. From this table it may readily be seen that: (*a*) radiation permits attainment of higher concentrations of gelatin in the extract liquor at any time; (*b*) use of radiation dosages of $1.5 \times 10^6$ rep. permits recovery of solutions of concentrations of almost 2½ times greater than the standard in the same period of time; and (*c*) by use of radiation it is possible to obtain any desired concentration in a period of time which may be as little as e.g. 25% of the time required to obtain the same concentration from a non-irradiated control.

Increase in molecular weight is particularly impressive. In one typical example wherein lime splits were subjected to a dosage of $1.5 \times 10^6$ rep. and the gelatin was extracted therefrom by the technique hereinbefore set forth, it was found that the molecular weight of the extracted gelatin was 525,000 as compared to 135,000 for that extracted from the non-irradiated stock. In another example wherein the extraction solvent contained 0.02 N hydrochloric acid and 0.15 N sodium chloride, the molecular weight of the extracted gelatin was 632,000 in comparison to 126,000 for gelatin extracted from non-irradiated stock.

On standing overnight, i.e. 18 hours, it was observed that a 1% solution of gelatin which had been extracted from stock irradiated in accordance with this invention, gelled to a firm gel. A control solution of gelatin extracted from the same stock which had not been irradiated, did not gel in this period, nor would this control sample gel at all under identical conditions.

It will be understood that while the invention has been described by means of specific examples, reference should be had to the appended claims for a definition of the scope of the invention.

What is claimed is:

1. The method of extracting gelatin from a collagen-containing material which comprises irradiating the colligen-bearing material with ionizing penetrating radiation having an energy of at least about $10^{-3}$ million electron volts at a dose of at least about $0.5 \times 10^6$ rep., contacting the irradiated material with an aqueous acid medium at a temperature of about 50° to 95° C. to extract gelatin from said material, and recovering the extracted gelatin.

2. The method of extracting gelatin from a collagen-bearing material which comprises irradiating the collagen-bearing material with gamma radiation having an energy of at least about $10^{-3}$ million electron volts at a dose of at least about $0.5 \times 10^6$ rep., contacting the irradiated material with an aqueous acid medium at a temperature of about 50° to 95° C. to extract gelatin from said material, and recovering the extracted gelatin.

3. The method of extracting gelatin from a collagen-bearing material which comprises irradiating the collagen-bearing material in substantially dry form, with ionizing penetrating radiation having an energy of at least about $10^{-3}$ million electron volts at a dose of at least about $0.5 \times 10^6$ rep., contacting the irradiated material with an aqueous acid medium at a temperature of about 50° to 95° C. to extract gelatin from said material, and recovering the extracted gelatin.

4. The method of extracting gelatin from a collagen-bearing material which comprises irradiating the collagen-bearing material with ionizing penetrating radiation having an energy of at least about $10^{-3}$ million electron volts at a dose of $0.5$–$1.5 \times 10^6$ rep., contacting the irradiated material with an aqueous acid medium at a temperature of about 50° to 95° C. to extract gelatin from said material, and recovering the extracted gelatin.

5. The method of extracting gelatin from a collagen-bearing material which comprises irradiating the collagen-bearing material with gamma radiation having an energy of at least about $10^{-3}$ million electron volts from cobalt-60, contacting the irradiated material with an aqueous acid medium at a temperature of about 50° to 95° C. to extract gelatin from said material, and recovering the extracted gelatin.

6. The method of extracting gelatin from a collagen-bearing material which comprises irradiating the collagen-bearing material with ionizing penetrating radiation having an energy of $10^{-3}$ to 15 million electron volts, contacting the irradiated material with an aqueous acid medium at a temperature of about 50° to 95° C. to extract gelatin from said material, and recovering the extracted gelatin.

References Cited in the file of this patent

Nature, vol. 166 (November 1950), pages 863 and 864.
Collinson et al.: "Chemical Reviews," pages 540–545, vol. 56, No. 3, June 1956.